United States Patent
Hoffman et al.

(10) Patent No.: US 9,817,253 B2
(45) Date of Patent: Nov. 14, 2017

(54) HIGH-SPEED WIDE FIELD-OF-VIEW ELECTRO-OPTIC SYSTEM AND METHOD

(71) Applicant: U.S. Army Research Laboratory ATTN: RDRL-LOC-I, Adelphi, MD (US)

(72) Inventors: Robert C. Hoffman, Woodstock, VA (US); Shizhuo Yin, State College, PA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 45 days.

(21) Appl. No.: 14/747,084

(22) Filed: Jun. 23, 2015

(65) Prior Publication Data

US 2016/0011440 A1    Jan. 14, 2016

Related U.S. Application Data

(60) Provisional application No. 62/021,914, filed on Jul. 8, 2014.

(51) Int. Cl.
*H04B 10/04* (2006.01)
*G02F 1/03* (2006.01)
(Continued)

(52) U.S. Cl.
CPC .......... *G02F 1/0327* (2013.01); *G02B 5/122* (2013.01); *G02F 1/0018* (2013.01); *G02F 1/0311* (2013.01); *G02F 1/0316* (2013.01)

(58) Field of Classification Search
CPC .............. H04B 10/112; H04B 10/1121; H04B 10/1141; H04B 10/516; H04B 10/541;
(Continued)

(56) References Cited

U.S. PATENT DOCUMENTS 3,938,878 A * 2/1976 Fox ........................... G02F 1/31
359/251
6,154,299 A 11/2000 Gilbreath et al.
(Continued)

OTHER PUBLICATIONS

Toyoda, Seji, et al. "Low-Driving-Voltage Electra-Optic Modulator With Novel KTa1xNbxO3 Crystal Waveguides," Japanese Journal of Applied Physics, vol. 43, No. 8B, (2004) pp. 5862-5866.
(Continued)

*Primary Examiner* — Hanh Phan
(74) *Attorney, Agent, or Firm* — Lawrence E. Anderson (57) ABSTRACT

An electro-optic modulator comprising at least one nanodisordered potassium tantalate niobate crystal; first and second conductors operatively connected to the nanodisordered potassium tantalate niobate crystal adapted to be connected to a voltage source to modulate light passing there through; whereby light is modulated by passing through the nanodisordered potassium tantalate niobate crystal. A method for modulating light comprising providing at least one at least one nanodisordered potassium tantalate niobate crystal; providing first and second conductors operatively connected to the nanodisordered potassium tantalate niobate crystal adapted to be connected to a voltage source to modulate light passing there through; providing an interrogating light beam striking at least one nanodisordered potassium tantalate niobate crystal; modulating light passing through the nanodisordered potassium tantalate niobate crystal; and receiving a modulated light beam.

20 Claims, 9 Drawing Sheets

(51) Int. Cl.
*G02F 1/00* (2006.01)
*G02B 5/122* (2006.01)

(58) Field of Classification Search
CPC ....... H04B 10/548; G02F 1/035; G02F 1/295; G02F 1/025
USPC ....... 398/118, 119, 130, 183, 188, 186, 169, 398/170, 127, 128; 385/1, 2, 4, 8, 24, 385/40; 359/245, 247, 260, 346
See application file for complete search history.

(56) References Cited

U.S. PATENT DOCUMENTS

| | | | |
|---|---|---|---|
| 7,272,270 B2 * | 9/2007 | Nakada | G02B 6/42 359/247 |
| 7,751,109 B1 | 7/2010 | Hoffman et al. | |
| 8,159,738 B2 | 4/2012 | Hoffman | |
| 8,363,300 B2 | 1/2013 | Hoffman | |
| 2007/0273948 A1 * | 11/2007 | Roes | G02B 5/122 359/529 |

OTHER PUBLICATIONS

Chang, YC, et al., "Giant electro-optic effect in nanodisordered KTN crystals," Opt Lett. Nov. 15, 2013;38(22):4574-7. doi: 10.1364/OL.38.004574.

Chang, Yun-Ching, et al., "Kovacs effect enhanced broadband large field of view electro-optic modulators in nanodisordered KTN crystals," Opt Express. Jul. 29, 2013;21(15):17760-8. doi: 10.1364/OE.21.017760.

Prados, A., et al, "The Kovacs effect: a master equation analysis," arXiv:0911.4015v2 [cond-mat.stat-mech] Jan. 14, 2010.

E. DelRe, E. Spinozzi, J. Agranat, and C. Conti, "Scale free optics and diffractionless waves in nanodisordered ferroelectrics," Nat. Photonics 5(1), 39-42 (2011).

J. Parravicini, A. Agranat, C. Conti, and E. Delre, "Equalizing disordered ferroelectrics for diffraction cancellation," Appl. Phys. Lett. 101(11), 111104 (2012).

J. Parravicini, C. Conti, A. J. Agranat, and E. DelRe, "Rejuvenation in scale-free optics and enhanced diffraction cancellation life-time," Opt. Express 20(24), 27382-27387 (2012).

T. Imai, M. Sasaura, K. Nakamura, and K. Fujiura, "Crystal growth and electro-optic properties of $KTa_{1-x}Nb_xO_3$," NTT Tech. Rev. 5(9), 1-8 (2007).

X. Wang, J. Wang, and B. Liu, "Growth and Properties of Cubic Potassium Tantalate Niobate Crystals," Adv. Mat. Res. 306-307, 352-357 (2011).

K. Nakamura, J. Miyazu, M. Sasaura, and K. Fujiura, "Wide-angle, low voltage electro-optic beam deflection based on space-charge-controlled mode of electrical conduction in $KTa_{1-x}Nb_xO_3$," Appl. Phys. Lett. 89(13), 131115 (2006).

Y.-C. Chang, C.-M. Lin, J. Yao, C. Wang, and S. Yin, "Field induced dynamic waveguides based on potassium tantalate niobate crystals," Optics Express 20(19), 21126-21136 (2012).

* cited by examiner

HIGH-SPEED WIDE FIELD-OF-VIEW ELECTRO-OPTIC SYSTEM AND METHOD

CROSS REFERENCE TO RELATED APPLICATIONS

This application claims priority to U.S. Provisional Application No. 62/021,914 to Shizhuo Yin, et al., entitled High-speed Wide Field-of-view Electro Optic Shutter, which is hereby incorporated by reference as though fully rewritten herein.

STATEMENT OF GOVERNMENT INTEREST

The invention described herein may be manufactured, used, imported, sold, and licensed by or for the United States Government without the payment of royalties thereon or therefore.

BACKGROUND OF THE INVENTION

There is a continuous effort to develop non-waveguide based, high-speed broadband large field-of-view electro optical (EO) modulators. Due to the existence of birefringence in linear EO crystals such as lithium niobate ($LiNbO_3$), they are not suitable for large field-of-view electro-optic modulators. Thus, quadratic EO materials (crystals and ceramics) are preferred for this application. Among the different types of quadratic EO materials available, the EO ceramic lead lanthanum zirconate titanate (PLZT) was intensively investigated for the application of large aperture and large field-of-view electro-optic modulators and shutter. Although PLZT-based electro-optic modulators can have a large aperture and large field of view, the speed is limited in the MHz range due to the existence of multiple domains in the ceramic material.

SUMMARY OF THE INVENTION

The present invention is directed to, inter alia, a preferred embodiment electro-optic modulator system, comprising a nanodisordered potassium tantalate niobate crystal; first and second conductors operatively connected to the nanodisordered potassium tantalate niobate crystal adapted to be connected to drive circuitry to modulate light passing therethrough; a retroreflector that reflects the modulated light; whereby light is intensity or phase modulated through the nanodisordered potassium tantalate niobate crystal in accordance with the voltage produced by the drive circuitry. Optionally light passing through the potassium tantalate niobate crystal is an interrogation light beam and the light reflected by the retroreflector is modulated as to phase or intensity.

The present invention is directed to, inter alia, an alternate preferred embodiment electro-optic modulator comprising at least one nanodisordered potassium tantalate niobate crystal; first and second conductors operatively connected to the nanodisordered potassium tantalate niobate crystal adapted to be connected to a voltage source to modulate light passing therethrough; whereby light is modulated by passing through the nanodisordered potassium tantalate niobate crystal.

Optionally, the modulator may comprise a plurality of potassium tantalate niobate crystals arranged in an array.

The present invention is directed to, inter alia, a method for modulating light comprising the following steps not necessarily in following order: providing at least one at least one nanodisordered potassium tantalate niobate crystal; providing first and second conductors operatively connected to the nanodisordered potassium tantalate niobate crystal adapted to be connected to a voltage source to modulate light passing therethrough;
providing an interrogating light beam striking at least one nanodisordered potassium tantalate niobate crystal;
modulating light passing through the nanodisordered potassium tantalate niobate crystal; and
receiving a modulated light beam.

BRIEF DESCRIPTION OF THE DRAWINGS

The foregoing and other objects, features, and advantages of the invention will be apparent from the following more detailed description of the preferred embodiments of the invention, as illustrated in the accompanying drawings, wherein.

A more complete appreciation of the invention will be readily obtained by reference to the following Description of the Preferred Embodiments and the accompanying drawings in which like numerals in different figures represent the same structures or elements. The representations in each of the figures are diagrammatic and no attempt is made to indicate actual scales or precise ratios. Proportional relationships are shown as approximates.

DESCRIPTION OF THE PREFERRED EMBODIMENTS

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention. Rather, these embodiments are provided so that this disclosure will be thorough and complete, and will fully convey the scope of the invention to those skilled in the art. In the drawings, the dimensions of objects and regions may be exaggerated for clarity. Like numbers refer to like elements throughout. As used herein the term "and/or" includes any and all combinations of one or more of the associated listed items.

The terminology used herein is for the purpose of describing particular embodiments only and is not intended to limit the full scope of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element such as an object, layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be understood that, although the terms first, second, etc. may be used herein to describe various elements, components, regions, layers and/or sections, these elements, components, regions, layers and/or sections should not be limited by these terms. For example, when referring first and second elements, these terms are only used to distinguish one element, component, region, layer or section from another region, layer or section. Thus, a first element, component, region, layer or section discussed below could be termed a second element, component, region, layer or section without departing from the teachings of the present invention.

Furthermore, relative terms, such as "lower" or "bottom" and "upper" or "top," may be used herein to describe one element's relationship to other elements as illustrated in the Figures. It will be understood that relative terms are intended to encompass different orientations of the device in addition to the orientation depicted in the Figures. For example, if the device in the Figures is turned over, elements described as being on the "lower" side of other elements would then be oriented on "upper" sides of the other elements. The exemplary term "lower", can therefore, encompass both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below. Furthermore, the term "outer" may be used to refer to a surface and/or layer that is farthest away from a substrate.

Embodiments of the present invention are described herein with reference to cross-section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region or object illustrated as a rectangular will, typically, have tapered, rounded or curved features. Thus, the regions illustrated in the figures are schematic in nature and their shapes are not intended to illustrate the precise shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will also be appreciated by those of skill in the art that references to a structure or feature that is disposed "adjacent" another feature may have portions that overlap or underlie the adjacent feature.

Although 40+ GHz waveguide based electro-optic (EO) modulators have become commercially available and have been successfully deployed in broadband fiber optic communication networks, they are not suitable for some other applications such as modulating retro reflectors (MRR) for broadband free space optical communication, high-speed large aperture optical shutters, laser pulse shaping, and laser Q-switches, which demand not only high modulation speed (~GHz) but also large optical throughput (mm-cm range aperture) and large field of view (e.g., +/−30 deg). Thus, there is a continuous effort to develop non-waveguide based, broadband, large field-of-view electro-optic modulators in the past four decades. Due to the existence of birefringence in linear electro-optic crystals such as lithium niobate ($LiNbO_3$), they are not suitable for large field-of-view electro-optic modulators. Thus, quadratic electro-optic (Kerr) materials (crystals and ceramics) are preferred for this application. Among the different types of quadratic electro-optic materials available, the electro-optic ceramic lead lanthanum zirconate titanate (PLZT) was intensively investigated for the application of large aperture and large field-of-view electro-optic modulators and shutters. Although PLZT-based electro-optic modulators can have a large aperture and large field of view, the speed is limited in the MHz range due to the existence of multiple domains in the ceramic material. It is extremely challenging to increase the speed of PLZT ceramic based modulator in the GHz range due to the slow domain wall movement.

On the other hand, electro-optic potassium tantalate niobate [$KTa_{1-x}Nb_xO_3$ (KTN)] crystals also have a large quadratic electro-optic coefficient and have been studied for more than four decades. However, high quality, sizable KTN crystals suitable for device fabrication have only become commercially available in the past several years, and that allows the construction of KTN modulators of the present description. One of the key factors that affect the practical usage of electro-optic modulators is the driving energy and driving power that is proportional to the quadratic electro-optic (Kerr) efficient. Even with the large quadratic electro-optic coefficient of KTN crystal, the driving energy still increases rapidly as the aperture size increases. Thus, there is a critical need to further increase the electro-optic coefficient, in particular for the large aperture and high speed electro-optic modulator because the driving power is driving energy divided by the modulation speed. For example, a one-nanosecond modulation speed will require a 1 megawatt (MW) driving power even with a 1 mJ driving energy. Such a large driving power is not preferred from the device point of view.

Figure 1:
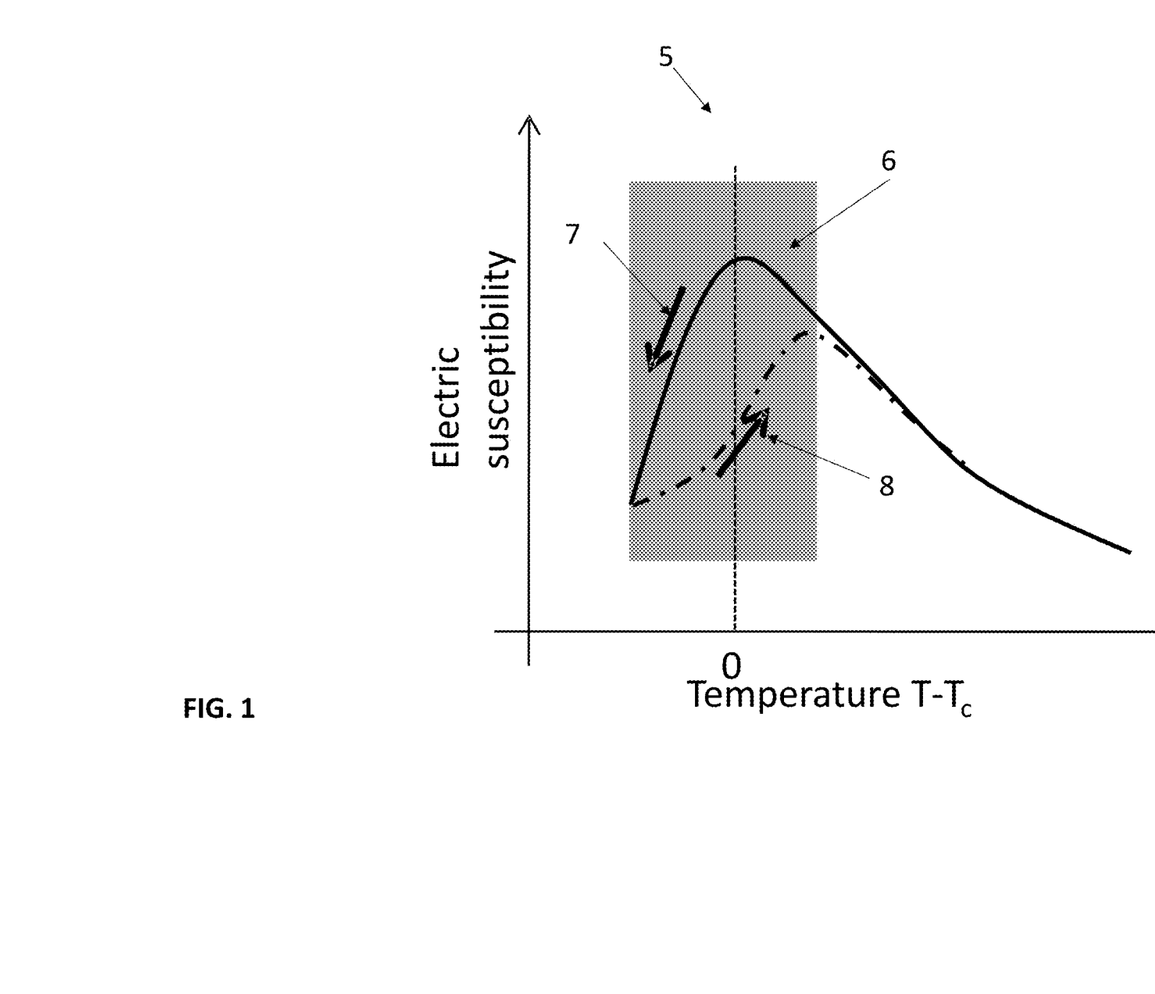
FIG. 1 is a conceptual illustration of electric susceptibility as a function of temperature for a nanodisordered KTN crystal with different temperature cycling histories. Solid curve: decreasing temperature, dashed curve: increasing temperature.

The Kovacs effect—simply stated—is that the dielectric properties (Kerr coefficient, permittivity) of the ferroelectric material system depend on the thermal cycling history. FIG. 1 is a conceptual illustration showing the effect 5 in a transparent ferroelectric material. It is a plot of dielectric susceptibility versus temperature. Decreasing the temperature to the Curie temperature (7) realizes a higher Kerr coefficient $\chi$ than the increasing temperature path (8) to the Curie temperature. The Curie temperature in ferroelectric materials is the temperature at which the dielectric properties, i.e., permittivity and Kerr coefficients, all reach a maximum value due to the condensation in the lattice of the lowest-frequency optical phonon. Thus, the EO coefficient can be substantially enhanced (a 3.5 fold increase) due to the existence of this effect in KTN crystals and the half-wave driving voltage can be correspondingly reduced. In our specific case the half-wave driving voltage went from 1500 V to 800 V. KTN crystals, when cooled at low rates, will form polar-nano regions (PNR) in the KTN crystal 11 (shaded region in FIG. 1). At these low cooling rates the polar-nano regions (PNRs) have time to grow to sizes approaching that of visible light. The result is scattering of the light, and one is unable experimentally unable to access the high Kerr coefficients in the shaded region because of the light scattering. However, high cooling rates (approaching 0.5 degrees C. per second) will prevent the growth of the polar-nano regions to the size of the wavelength of light. This is the so-called "nanodisordered state"—a term used by some researchers to describe the reduction in size of the polar-nano regions that eliminates light scattering. The reduction in light scattering now makes it possible to use the KTN as a modulator very near Tc, with all its attendant benefits of reduced driving energy and driving power. Potassium tantalum Niobate (KTN) possesses all of the desirable qualities required of a high-speed, wide field-of-view modulator material, including a large second-order electro-optic (Kerr) coefficient, enabling a KTN device to operate at lower voltages One can substantially increase the Kerr coefficient $\chi$ by employing proper thermal cycling without suffering the limitation of optical scattering. To illustrate the advantage of applying this larger electric susceptibility to electro-optic modulator, a quantitative relationship between the electrical driving energy/power and the electric susceptibility for the nanodisordered KTN crystal based EO modulator can be described. It can be seen that such an enlarged electric susceptibility can not only enhance the refractive index modulation but also reduce the switching energy/power.

Figure 2:
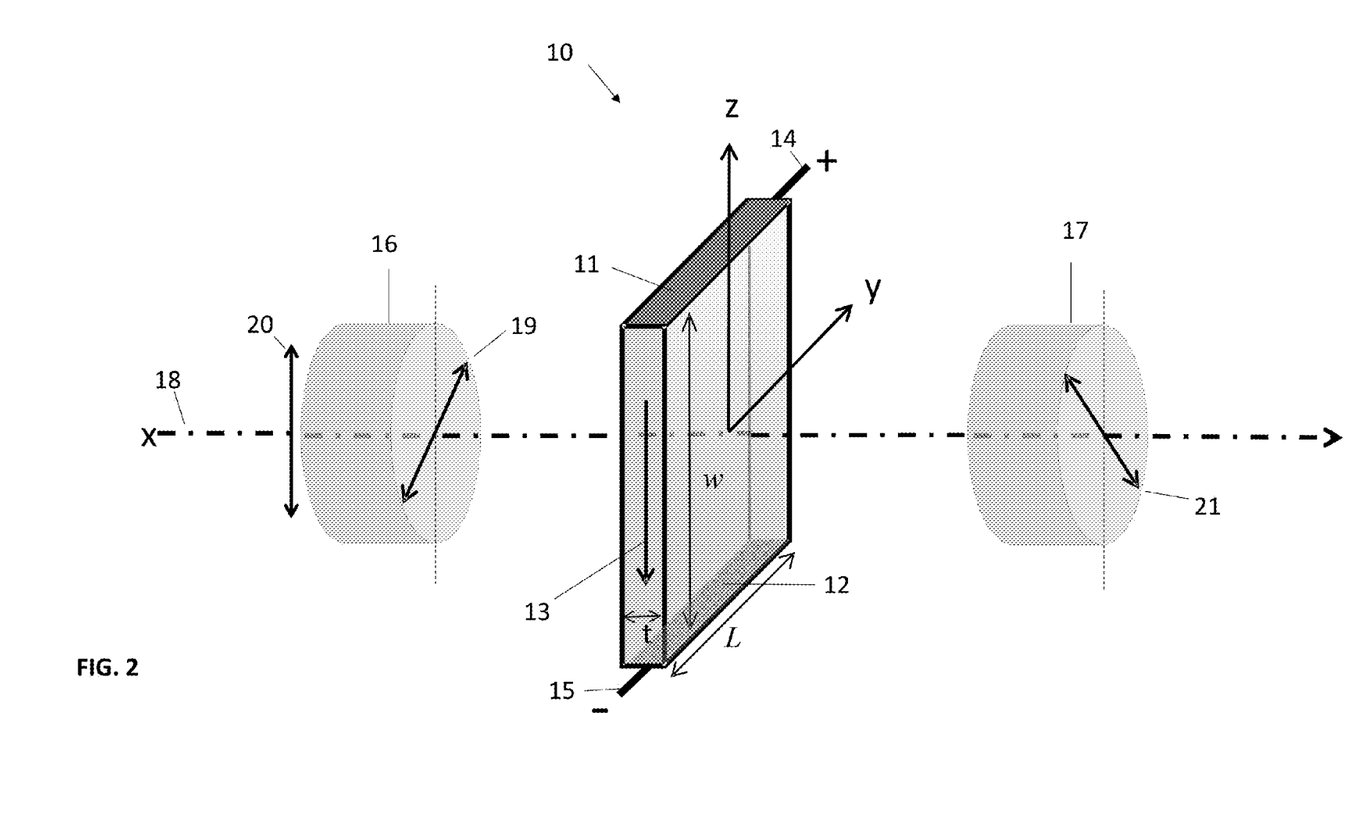
FIG. 2 is a conceptual illustration of a transverse large aperture nanodisordered KTN crystal based electro-optic modulator.

The electro-optic shutter device of FIG. 2 comprises a Kerr cell device 10 comprised of a first polarizer 16 having a first face and a second face opposite the first face. The Kerr cell device 10 (i.e., the electro-optic element of the electro-optic shutter) has a first face and a second face opposite to the first face, and an outer circumference therebetween. The first face of the Kerr cell device 10 is disposed adjacent to the second face of the polarizer 16. The Kerr cell device 10 operates as a half-wave plate when a voltage $V_x$ is applied to the element via positive and negative terminal connections 14 and 15, respectively, and to the electrode 11, which is in electrical contact with the positive terminal connection, and electrode 12, which is in electrical contact with the negative terminal connection. Disposed adjacent to the second face of the Kerr cell device 10 is a second polarizer 17 having a first face and a second face opposite the first face.

The first polarizer 16 is disposed adjacent to the one transverse surface of the Kerr cell device 10 and has a first transmission axis 19 oriented 45 degrees relative to the z-axis of the KTN. The second polarizer 17 is disposed adjacent to the other transverse surface of the Kerr cell device 10 and has a second transmission axis 21 that is 90 degrees different from the transmission axis 19 of the first polarizer 16. Each electrode 11, 12 is disposed on one of the transverse surfaces of the Kerr cell device 10 (i.e., the electro-optic element), and has an electric field 13 which is substantially uniform over the transverse extent of the Kerr cell device 10 (i.e., the electro-optic element). Unpolarized light, or light of an arbitrary polarization 20, propagating along the x axis 18 enters the first polarizer 16. The incoming light is modulated at high speed using a high-voltage, high-frequency electrical signal applied to electrodes 11 and 12. The high frequency electrical signal modulates the polarization state of the light passing though the Kerr cell device, causing the transmitted light intensity or phase to vary in proportion to the applied high frequency signal. This configuration as shown is embodied as a normally opaque device, although by rotating analyzer 17 to have its polarization axis 21 parallel to that of the polarizer 16, the configuration can be rendered a normally transparent device. Without polarizer 16 and analyzer 17, the device can be embodied as a pure phase modulator wherein the intensity of the exiting light remains constant but the phase of the two components of the electric field of the transmitted light with respect to the y and z directions is allowed to vary. The phase changes can then be detected in the far field by a phase-sensitive optical detector.

FIG. 2 is an illustration of a large aperture KTN based transverse electro-optic modulator, where w, L and t denote the gap between two electrodes, the length of the electrode, and the thickness of the crystal, respectively. For the purpose of simplicity, consider the case of w, l>>t, which is a realistic case. In this case, one can assume that the electric field is uniformly distributed within the crystal and along the vertical (y) direction, as illustrated in FIG. 2. The stored electric energy, U, is then given by $$U = \frac{1}{2}\varepsilon \int_V |E|^2 dV \qquad (3)$$
$$= \frac{1}{2}\varepsilon_0 \varepsilon_r E^2 L \times w \times t$$
$$\approx \frac{1}{2}\varepsilon_0 \chi E^2 L \times w \times t,$$

where $\epsilon_0$ is the dielectric constant in vacuum, $\epsilon_r$ is the relative dielectric constant and approximately equals to $\chi$ when $\chi \gg 1$ for the case of nanodisordered KTN crystal, and E is the magnitude of the applied electric field. The electric field induced refractive index difference between the horizontal (x) and vertical (y) polarized light, $\Delta n$, is expressed as $$\Delta n \approx \frac{1}{2} n_0^3 \varepsilon_0^2 \chi^2 (g_{11} - g_{12}) E^2, \qquad (4)$$

where $n_0$ is the refractive index without external electric field, and $g_{11}$ and $g_{12}$ are the quadratic electro-optic coefficient. The quadratic electro-optic coefficient $g_{ik}$ instead of $s_{ik}$ is used in Eq. (4) because $g_{ik}$ is the proportional coefficient between the optical impermeability tensor and electric polarization density, which does not depend on electric susceptibility $\chi$. On the other hand, $s_{ik}=\epsilon_0^2\chi^2 g_{ik}$ is the proportionality coefficient between the optical impermeability tensor and the electric field, which does depend on electric susceptibility. Based on Eq. (4), the required half-wave switching electric field, $E_\pi$, which changes the polarization state of the light in phase of $\pi(\Delta nt=\lambda/2)$ for a Kerr electro-optic modulator, as depicted in FIG. 2 can be derived as $$E_\pi = \sqrt{\frac{\lambda}{n_0^3 \varepsilon_0^2 \chi^2 (g_{11}g_{12})t}}, \qquad (5)$$

where $\lambda$ is the wavelength of the light. Substituting Eq. (5) into Eq. (3), the required half-wave electric switching energy, $U_\pi$, is obtained as $$U_\pi \approx \frac{1}{2}\varepsilon_0 \chi E^2 L \times w \times t = \frac{\lambda L \times w}{2 n_0^3 \varepsilon_0 \chi (g_{11} - g_{12})}. \qquad (6)$$

Since $U_\pi$ is inversely proportional to $\chi$, the increased electric susceptibility for the nanodisordered KTN can reduce the required switching energy.

Figure 3:
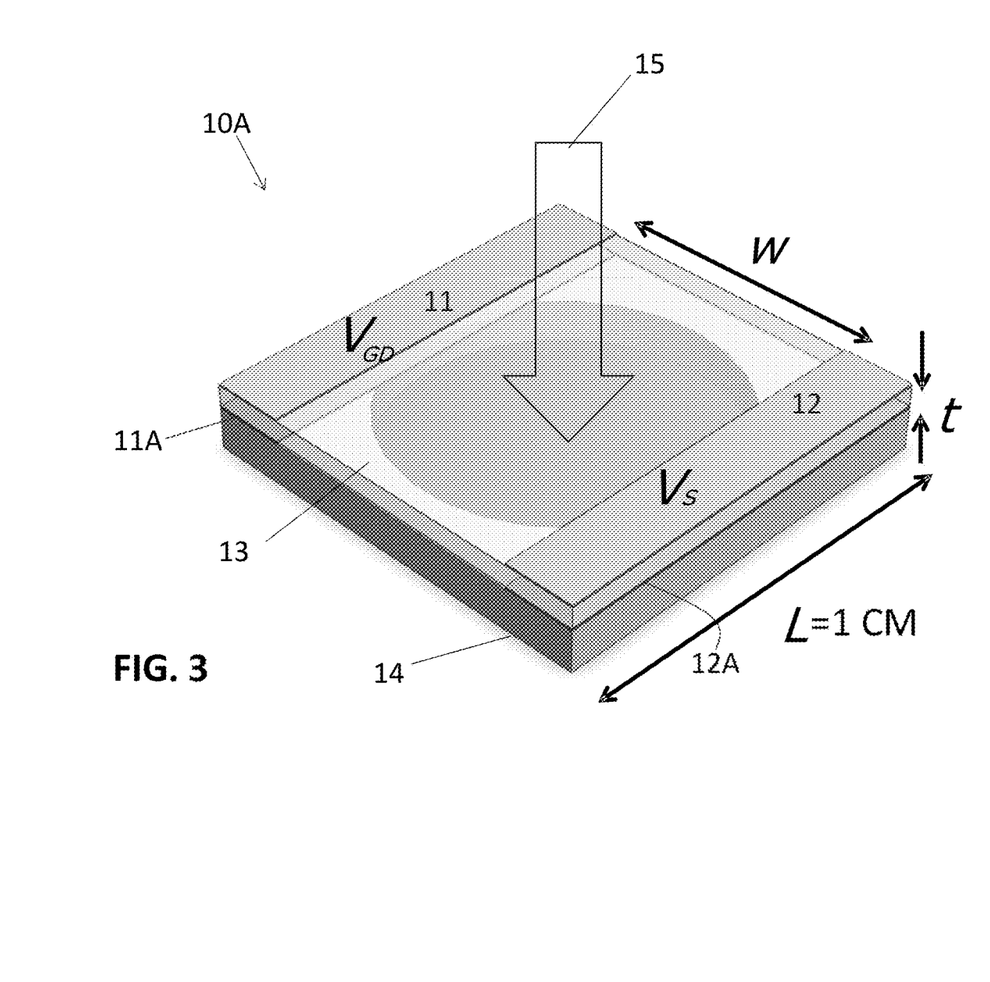
FIG. 3 is a schematic sketch of a transverse electro-optic modulator

To fabricate such a modulator employing a nanodisordered KTN crystal, a transverse KTN based EO modulator, as shown in FIG. 3, can be fabricated. The KTN crystal 13 in the transverse EO modulator 10A has a composition of $KTa_{0.65}Nb_{0.35}O_3$ and a dimension of 10 mm×10 mm×0.5 mm. Gold electrodes 11, 11A, 12, 12A with a width of 1.75 mm are coated on both top and bottom surfaces, as illustrated in FIG. 3. Alternatively, the electrodes can be deposited on the ends rather than the top and bottom surfaces as shown. After the electrode coating, the optical aperture dimension of the modulator became L=10 mm, w=6.5 mm, and t=0.5 mm. Since both L and w were much larger than t, the electric field was quite uniform within the crystal. The entire device is then attached to thermoelectric (TE) cooler 14 to control the device temperature. The light propagates through the device 10A in direction 15.

The half wave switching voltage, $V_\pi$, at the same temperature but with different thermal histories were measured. Since the half wave switching voltage is inversely proportional to electric susceptibility, as given by $$V_\pi = E_\pi w = \sqrt{\frac{\lambda w^2}{n_0^3 \varepsilon_0^3 \chi^2 (g_{11} - g_{12})t}}, \qquad (7)$$

one should see a reduced half wave voltage if there is a Kovacs effect enhanced $\chi$. Measuring half wave voltages at different temperatures and with different temperature histories can demonstrate the enhancement: one sample measured during the temperature increasing process, corresponds to point B of FIG. 1. Another sample measured during the temperature decreasing process, corresponds to point A of FIG. 1. The temperature changing rate was 0.1° C./s. The Curie temperature of the KTN sample was −4° C. The half wave voltage is determined by measuring the optical transmission as a function of applied driving voltage. Then, $s_{11}$-$s_{12}$ value was determined from the measured half wave voltage, as given by $$s_{11} - s_{12} = \varepsilon_0^2 \chi^2 (g_{11} - g_{12}) = \frac{\lambda w^2}{n_0^3 t} \times \frac{1}{V_\pi^2}. \qquad (8)$$

Figure 4:
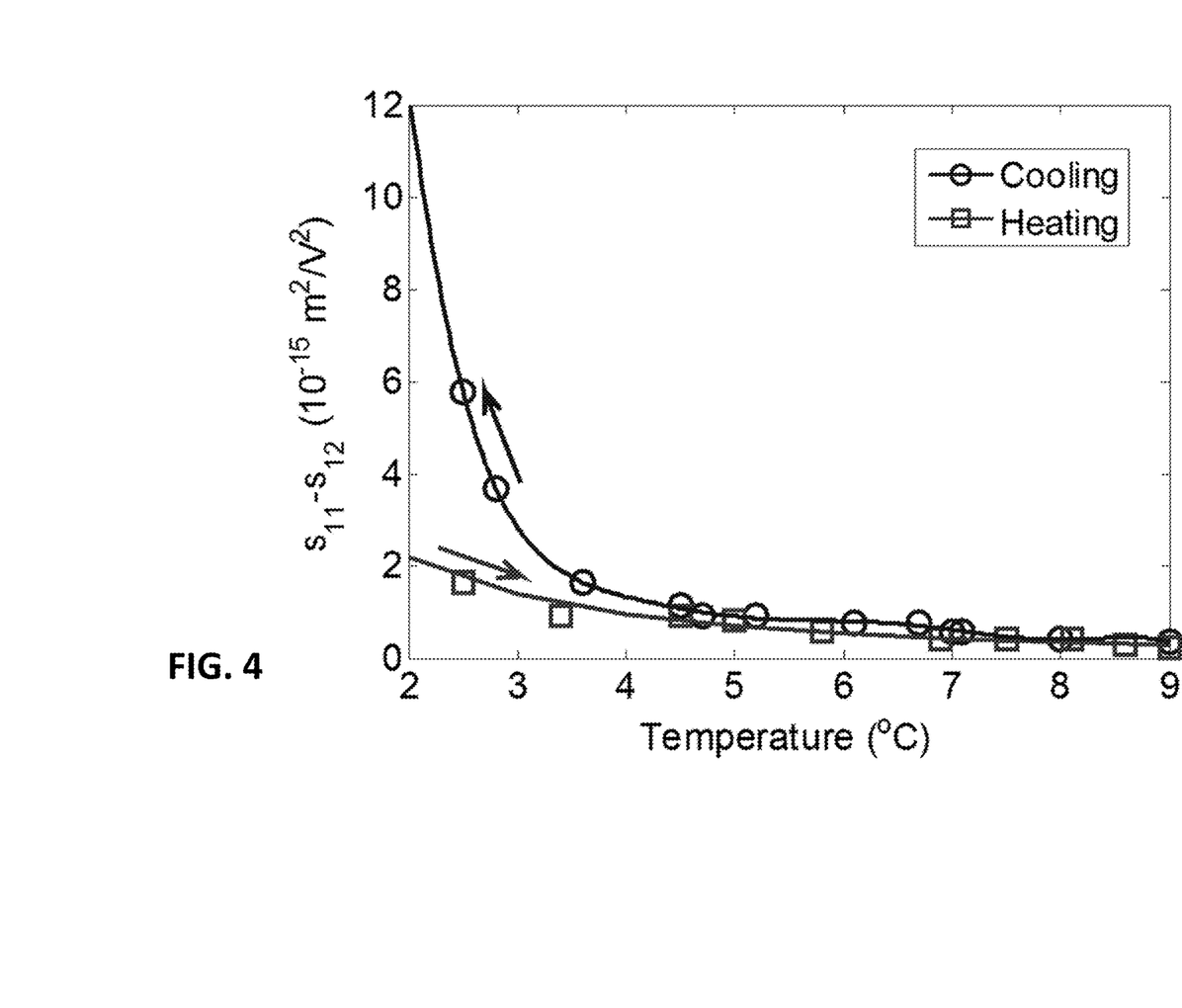
FIG. 4 is the experimentally measured transmission quadratic electro-optic coefficient as a function of temperature. Circle line: decreasing temperature history; Square line: increasing temperature history.

FIG. 4 shows the experimentally measured quadratic electro-optic coefficients $s_{11}$-$s_{12}$ as a function of temperature for different temperature cycling histories. The circle and square lines denote the temperature decreasing and temperature increasing processes, respectively. One can clearly see that the quadratic EO coefficients $s_{11}$-$s_{12}$ were larger when the sample had a decreased temperature cycling history due to the formation of a nanodisordered KTN crystal. Also, the difference of EO coefficient between the decreasing and increasing temperature cycling histories become larger and larger when the temperature approaches the Curie point. For example, $s_{11}$-$s_{12}$=5.78×10$^{-15}$ m$^2$/V$^2$ with a decreasing temperature history at 2.5° C. On the other hand, $s_{11}$-$s_{12}$=1.64× 10$^{-15}$ m2/V$^2$ with an increasing temperature history at the same 2.5° C. measurement temperature. Thus, there is a 3.5 fold increase in quadratic EO coefficient, which results in a factor of 1.87 reduction in required driving voltage.

In addition, the Curie temperature and EO coefficient of $KTa_{1-x}Nb_xO_3$ crystal depends on the composition parameter x. They can have very different values when the value of x changes, which can affect the degree of enhancement due to the Kovacs effect. Thus, it is possible to achieve an even larger enhancement factor (i.e., >3.5) for a KTN crystal with other composition parameter x (e.g., x=0.4).

Figure 5:
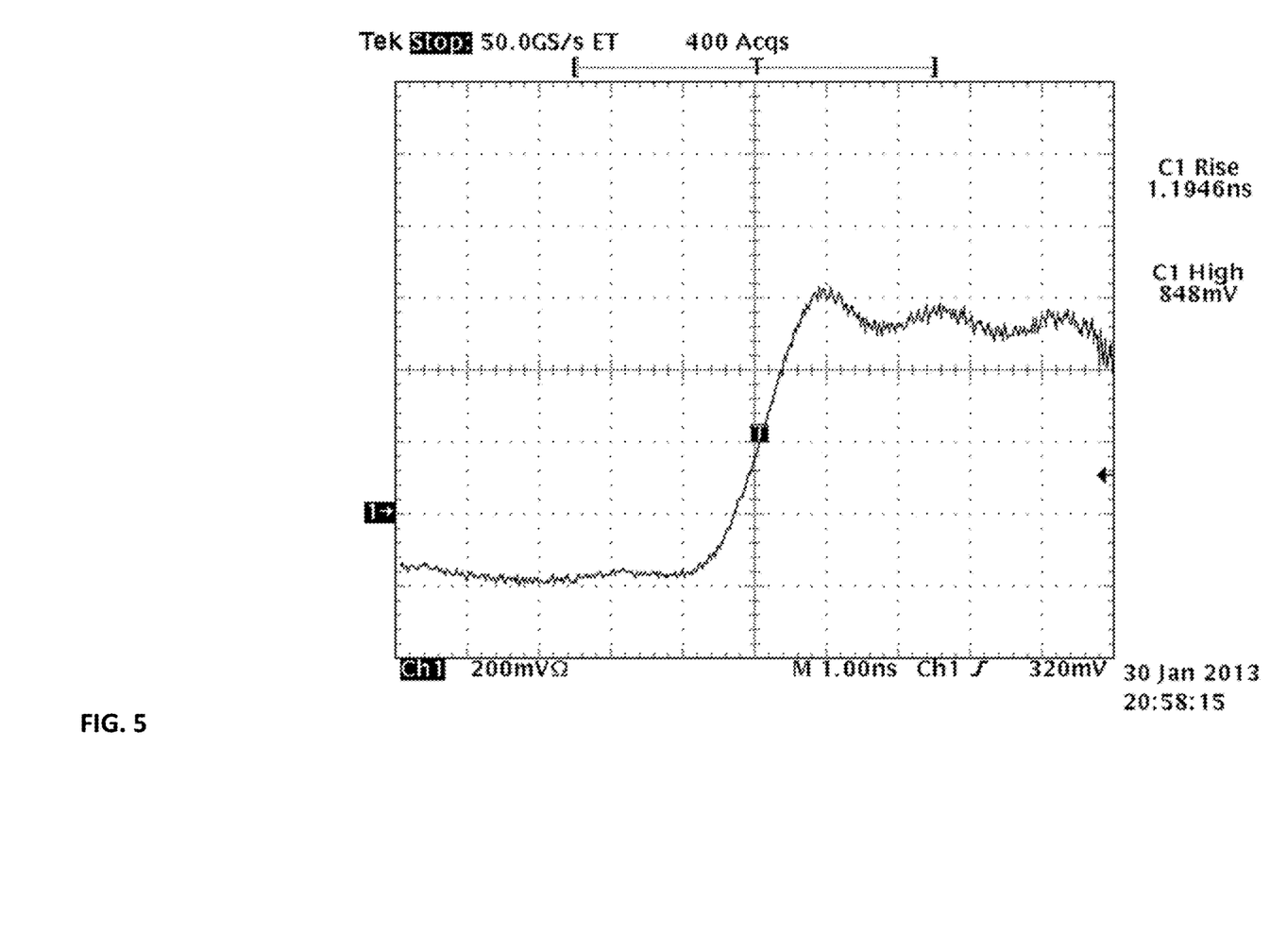
FIG. 5 is the experimentally measured response time of the nanodisordered KTN crystal based quadratic electro-optic modulator.

To demonstrate that the KTN crystal EO modulator was a broadband electro-optic modulator, the response time of the modulator is measured by using the embodiment as depicted in FIG. 2. A high voltage pulsed voltage power supply with a maximum output voltage 10,000V, a rise time 1 ns, and a 50Ω impedance was used to drive the EO cell. A high speed photodetector with a<1 ns response time was used to detect the output optical pulse. To minimize the influence from the capacitance of EO modulator, the length of the electrode was reduced from L=10 mm to L=2 mm while maintaining the same gap, w=6.5 mm. FIG. 5 shows the experimentally detected output signal as a function of time when a square pulse (corresponding to the half wave voltage of the modulator) was applied on the modulator. It can be seen that the rising time, defined as the time from 10% to 90%, closes to 1 ns. Thus, the developed modulator is indeed a broadband modulator with a GHz bandwidth. It should be noted that the rise time is mainly limited by the RC time constant rather than the quadratic EO effect itself. It should also be mentioned that as the temperature approaches the phase transition temperature, the permittivity ∈ increases, which can increase the capacitance and rise time if all the other parameters remain the same. However, since the electro-optic effect induced refractive index change is approximately proportion to the square of dielectric constant, as given by Eq. (4), one can maintain the same capacitance by using a wider electrode gap, W, as illustrated in FIG. 3, to compensate the increase of dielectric constant without increasing the half-wave voltage so that the overall capacitance maintains the same. In practice, since the driving energy is inversely proportional to dielectric constant, as given by Eq. (6), a higher dielectric constant is preferred. The permittivity thus gives the device designer an additional parameter to adjust.

Figure 6:
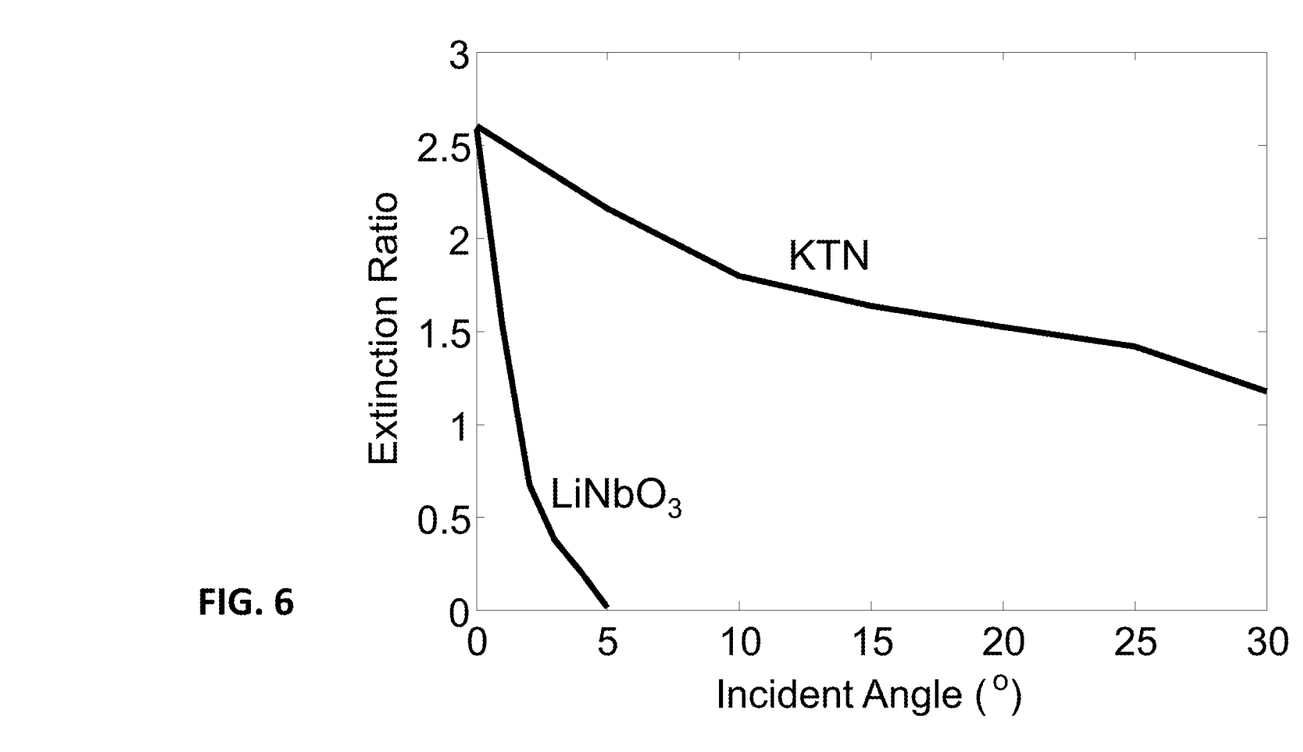
FIG. 6 is the experimentally measured extinction ratio as a function of incident angle. Solid line: the result for nanodisordered KTN crystal based quadratic electro-optic modulator; dashed line: the result for lithium niobate based electro-optic modulator.

Because KTN is not inherently birefringent, the device will naturally have a large field-of-view. The large field of view of the EO modulator is demonstrated by measuring the extinction ratio as a function of incident angle in FIG. 6. In the experimental measurement, the EO modulator was rotated by a precise rotating stage. The transmittances were measured at both the ON state (i.e., the transmission state with the half wave voltage) and OFF state (i.e., blocking state without the applied voltage) for a set of incident angles within the range of +/−30 deg. Mathematically, the extinction ratio is defined as $E_r = \log(T_{on}/T_{off})$ and in units of OD. It can be seen that the extinction changes slowly in KTN as the incident angle increases. For the purpose of comparison, the extinction ratio as a function of rotation angle for the linear $LiNbO_3$ based EO modulator with the same transverse configuration was also measured. By comparing two plots, one can clearly observe that the presented EO modulator indeed has a larger field of view than the conventional linear EO modulator.

Construction of an ultrafast shutter with a small aperture (using a single KTN crystal) is fairly simple. A 6.5 mm×10 mm aperture has been demonstrated, limited by the available crystal sizes. In addition 2 cm×2 cm KTN crystals are available and are being tested—and this is currently the effective upper size limit for a single element shutter device. The single-element shutter device is currently perfectly suitable for use in modulating retro-reflectors, laser q-switches, and modulators for free-space communications. The KTN is attached to a thermoelectric cooler at the KTN crystal's periphery (FIG. 3) as previously described. For KTN with a Tc below room temperature condensation of moisture can be an issue. In this case the entire KTN/TE cooler assembly can be placed within a small sealed housing to prevent moisture from entering the device. This arrangement works well for a single KTN crystal where the area of the KTN is relatively small.

However, when constructing larger arrays for use in imaging systems, device construction becomes more complicated, and temperature control of a large-area device becomes important. Also, the fill-factor (% of space occupied by the useful elements) of the KTN array would be adversely affected if TE coolers were used on the array itself, as is the case for a smaller aperture device.

Figure 7A:
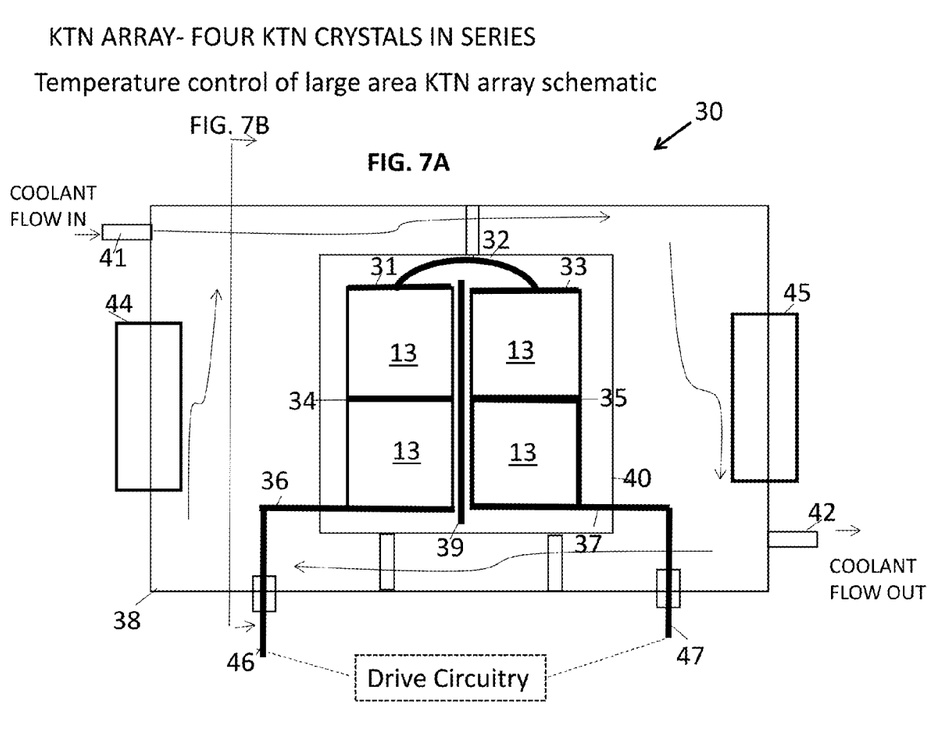
FIG. 7A is a schematic of a multiple-element nanodisordered potassium tantalate niobate crystal array 30.

FIG. 7A illustrates a KTN array 30 comprising four 1 cm×1 cm KTN crystals 13 connected in series (which lowers the capacitance) by conductive strips (such as copper strips) 31 and 33-37 that may be, for example, 1 mm wide and 100 microns thick. The conductive strips 31 and 33 are connected by a bridge strip 32. The four crystals 13 are bonded to a fused silica substrate 40 using optical adhesive. The ground plane 39 may be isolated or connected to Earth ground. The ground place 39 is place between the KTN crystals 30 so that a voltage potential does not develop between the left and right sides of the KTN array as shown in FIG. 7A. During operation, a high voltage is applied across leads 36 and 37. The potential drops evenly across conductive strips 36-34, 34-31, 33-35 and 35-37, which is tantamount to placing capacitors in series $1/C_{36-34} + 1/C_{34-31} + 1/C_{31-35} + 1/C_{35-37} = 1/C_{36-37}$ (total).

Figure 7B:
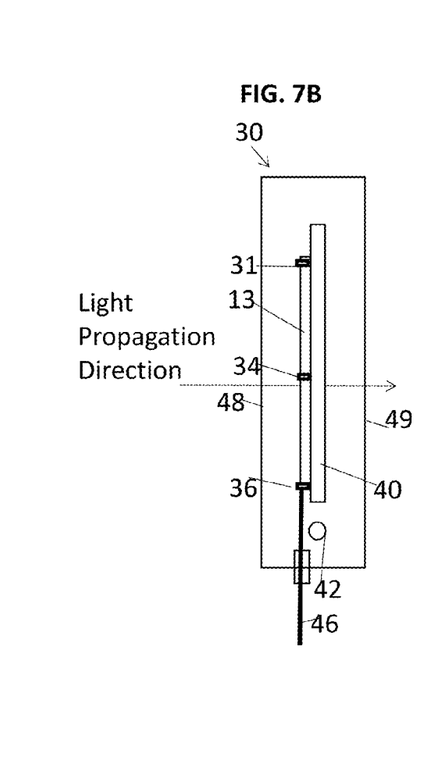
FIG. 7B is a side view showing the cross-section of the nanodisordered potassium tantalate niobate crystal array 30.

FIG. 7B is a side view showing the cross-section of the KTN array 30 showing the four crystals 13 in cross-section mounted to the fused silica substrate 40. The conductive strips 33, 35 and 37 are shown, however, the strips 31, 34 and 36 are located behind 33, 35 and 37.

Figure 8A:
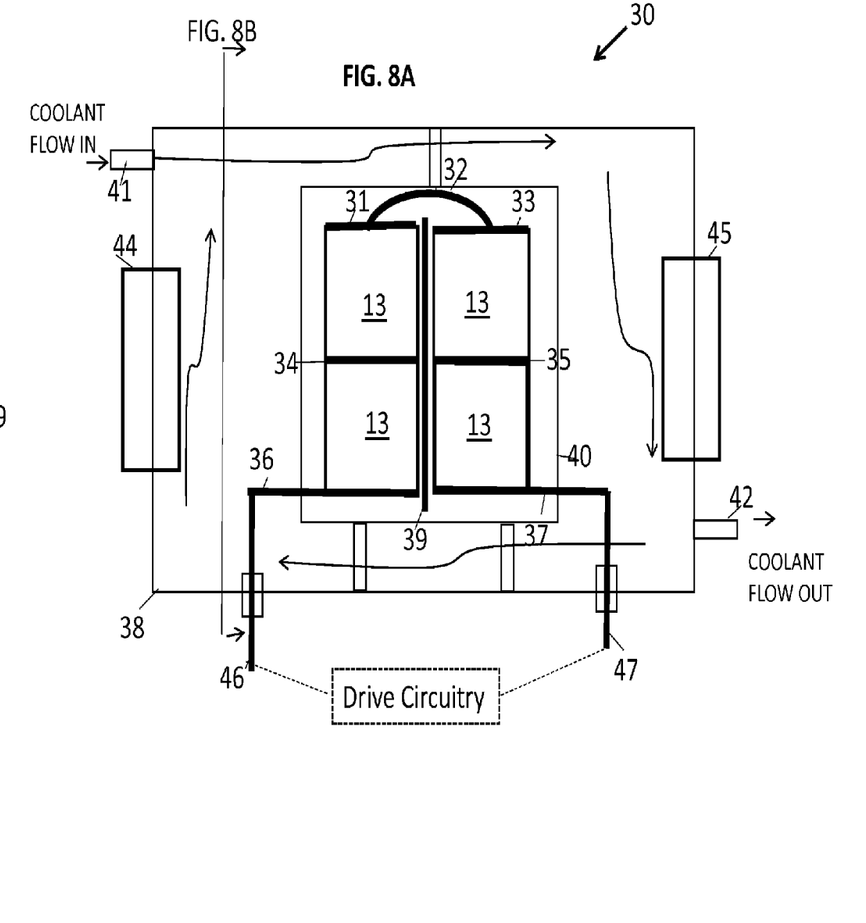
FIG. 8 is a schematic to illustrating how the nanodisordered potassium tantalate niobate crystal array temperature would be controlled using forced air cooled and heat by TE coolers.
Figure 8B:
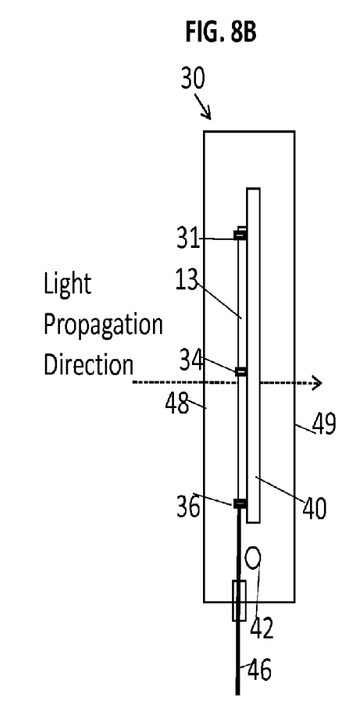

FIG. 8 then shows the KLN array 30 placed within a sealed container or housing 38 with transmitting windows 48 and 49 so that the array can be accessed optically. Air or other cooling fluid is forced through the container/housing 38 through inlet 41 and outlet 42 in a turbulent fashion so that maximum heat transfer occurs from the air or fluid to both sides of the KTN array 30. Thermoelectric heaters/coolers 43, 44 are placed on the sides of the sealed container 38 to cool and heat the array uniformly. The thermoelectric coolers (heat exchangers) 43 and 44 are placed so that direct thermal contact is made with the air in the container 38 and to the outside environment to facilitate heat transfer. A gas with a high thermal conductivity, such as xenon, can be used instead of air to maximize heat transfer to and from the KTN, as well as a liquid-phase coolant. In this manner the temperature can be stabilized, keeping the KTN array 30 at the proper temperature. In operation, the air would be heated by reversing the current flow to the thermoelectric cooler and once the KTN array is heated, the current would be reversed to begin the cooling process to bring the temperature of the KTN uniformly to near the critical temperature Tc where it is stabilized. At this point the array is ready for operational use. The procedure is repeated each time the array is turned on and prepared for use.

Windows 48, 49 enable light to be transmitted through the housing. During operation, a high voltage is applied across leads 46 and 47, which are external to the housing 38. The potential drops evenly across conductive strips 36-34, 34-31, 33-35 and 35-37, which is tantamount to placing capacitors in series $1/C_{36-34} + 1/C_{34-31} + 1/C_{31-35} + 1/C_{35-37} = 1/C_{36-37}$ (total).

Figure 9A:
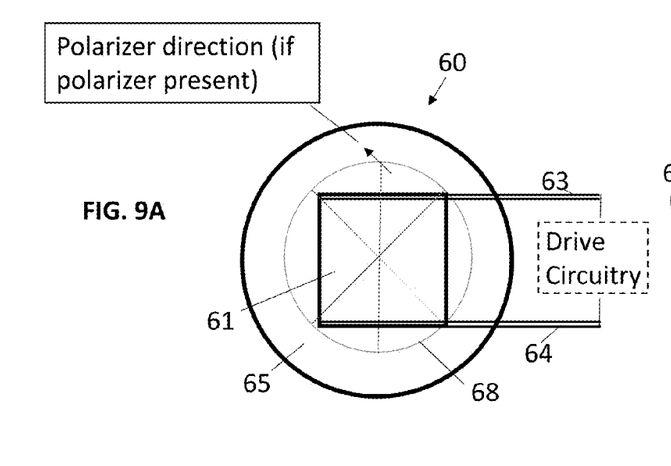
FIG. 9A is a schematic of a high-speed free space the nanodisordered potassium tantalate niobate crystal modulator modified with corner cube prism to form a modulating retro-reflector device.

There are two classes of devices that are ready to be commercialized. The first is the free-space modulator 60, shown in FIGS. 9A and 9B. In applications where power is not at a premium, the KTN can operate farther away from Tc where the Kerr coefficient is less, but the device is less sensitive to temperature. In this case a thermoelectric cooler is not required and the device construction is simple and is constructed by mounting the 1 cm×1 cm KTN crystal 61 on a sapphire disc 62 with optical adhesive, and the copper lead strips 63, 64 are attached using conducting adhesive and connected to an impedance-matched transmission line. The device has a sapphire front cover 65 on which can be mounted a polarizer 66—for use as an intensity modulator. The polarizer 66 may be attached to the entrance face of the unit, also using optical adhesive. For use as a phase modulator, the polarizer 66 can be omitted. A spacer 67 is positioned between the sapphire disc or mount 62 and the sapphire cover 65.

Figure 9B:
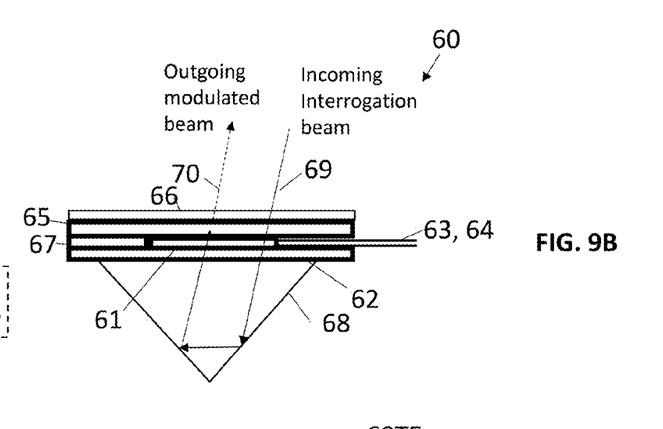
FIG. 9B is a cross-sectional view of the embodiment shown in FIG. 9A.

Continuing with FIG. 9B, the free space modulator device 60 includes a corner cube prism attached. A corner cube prism 68 reflects incoming light coming from any arbitrary direction back to its source, resulting in a secure communications link. The device so equipped now becomes a modulating retro-reflector.

Figure 9C:
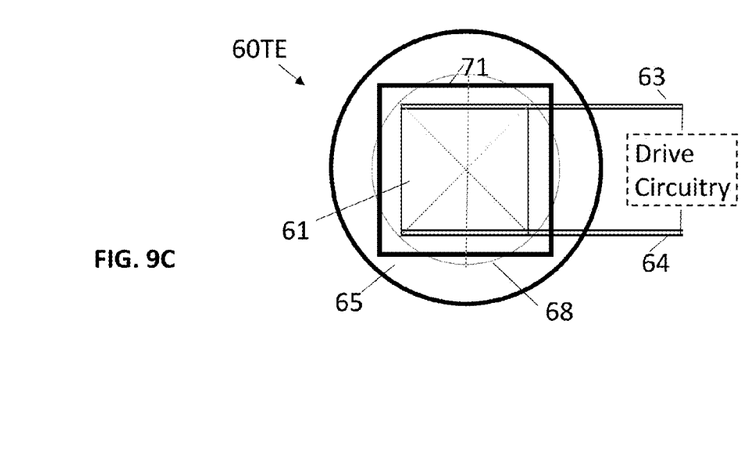
FIG. 9C is a schematic of a high-speed free space the nanodisordered potassium tantalate niobate crystal modulator modified with corner cube prism to form a modulating retro-reflector device further comprising a thermoelectric cooler.
Figure 9D:
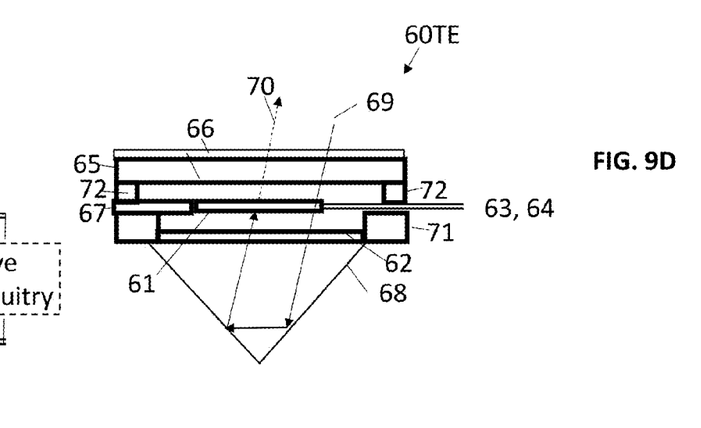
FIG. 9D is a cross-sectional view of the embodiment shown in FIG. 9C.

In the embodiment shown in FIGS. 9C and 9D, the free space modulator device 60TE further includes a thermos electric heater/cooler 71 to which the corner cube prism 68 is attached. A corner cube prism 68 reflects incoming light coming from any arbitrary direction back to its source, resulting in a secure communications link. The device so equipped now becomes a modulating retro-reflector. The free space modulator 60TE is constructed by mounting the 1 cm×1 cm KTN crystal 61 on a sapphire disc 62 with optical adhesive, and the copper lead strips 63, 64 are attached using conducting adhesive and connected to an impedance-matched transmission line. The device has a sapphire front cover 65 on which can be mounted a polarizer 66 for use as an intensity modulator. The polarizer 66 may be attached to the entrance face of the unit, also using optical adhesive. For use as a phase modulator, the polarizer 66 can be omitted. A spacer 67 is positioned between the sapphire disc or mount 62 and the sapphire cover 65.

In the FIG. 9A-9D embodiments, interrogation beam 69 passes through transmissive free space modulators 60 and 60TE. Transmissive free space modulators 60, 60TE are controlled by application of voltages upon leads 63 and 64 of the modulators 60, 60TE, and in particular to the KTN layer/crystal 61, corresponding to an input signal. These voltages cause the modulators 60, 60TE to shutter the interrogation light passing therethrough, resulting in a modulated interrogation beam 69. The modulated interrogation beam 69 travels into and is reflected from solid retro-reflector 68. The reflected modulated beam 69 then travels back through, and is again modulated by, the KTN layer/crystal 61, thus reinforcing the original modulation. After passing through KTN 61 layer/crystal this second time, reflected modulated beam 70 travels to a receiver (or back to the source).

A modulating retro-reflector can be attached to a vehicle, UAV, aircraft, satellite, ship and any device that needs to be "interrogated" from a distance using a secure optical communications link. Modulating reflectors are disclosed in U.S. Pat. No. 6,154,229, herein incorporated by reference. The modulating retro-reflector is not a new concept, but the present invention dramatically improves the modulating retro-reflector. The high frequency response (~1 GHz) means fast data rates, and the large angle of acceptance (up to +/−30 degrees from normal incidence) means any platform with an modulating retro-reflector can be interrogated over a much wider field of view than previously possible. These are significant advances over modulating retro-reflector devices that use liquid crystal (LCD) modulators. If modulating power is at a premium, the device can operate closer to Tc, resulting in a lower driving energy, but the device now does require temperature stabilization using a thermo-electric cooler as shown in FIG. 9B. Attached to a thermally conducting housing, the thermoelectric cooler will stabilize the temperature of the free space modulator/modulating retro-reflector. In the case of FIG. 9B where the thermoelectric cooler is attached, spacers are added in the device to provide insulating room above and below the KTN to assist in temperature stabilization. The size of these devices is less than 2.5 cm in diameter, although larger devices can be constructed with some tradeoff with regard to modulating bandwidth.

The present invention is directed to a modulator which may be utilized as a high-speed, wide field-of-view, large aperture shutter. The preferred embodiments are made of KTN in the nanodisordered state that can be used as a free-space modulator (with or without a retro reflector. As a free space modulator the present invention can be used for high-speed, long distance line-of-sight laser communications, or it can serve as a starting point to make other devices. The basic free space modulator can have added behind it a retro reflector to produce a modulating retro reflector. The modulating retro reflector or the free space modulator can be used with polarizers to produce an intensity modulator. The modulating retro reflector or the free space modulator can be used without polarizers to make a pure phase modulator.

Obviously, many modifications and variations of the present invention are possible in light of the above teachings. It is therefore to be understood that, within the scope of the appended claims, the invention many be practiced otherwise than as specifically described.

What is claimed is:

1. An electro-optic system comprising:
   a plurality of nanodisordered potassium tantalate niobate crystals;
   first and second conductors configured to connect the nanodisordered potassium tantalate niobate crystals in series and adapted to be connected to drive circuitry to modulate light passing therethrough;
   a retroreflector that reflects the modulated light through the array of nanodisordered potassium tantalate niobate crystals;
   whereby light is intensity or phase modulated through the nanodisordered potassium tantalate niobate crystals in accordance with the voltage produced by the drive circuitry.

2. The system of claim 1 where the light passing through the plurality of potassium tantalate niobate crystals comprises an interrogation beam emitted by a light source and wherein the light reflected by the retroreflector comprises a phase or intensity modulated beam which is received by a receiver.

3. The system of claim 1 wherein the system is a free space modulator and further comprising polarizers configured to provide an intensity modulator.

4. The system of claim 1 wherein prior to operation the temperature of the plurality of nanodisordered potassium tantalate niobate crystals is reduced to the Curie temperature, causing them to become nanodisordered, in order to realize a higher electro-optic Kerr coefficient; the Curie temperature corresponding to the temperature at which permittivity and Kerr coefficients reach a maximum value, such that the electro-optic Kerr coefficient can be substantially enhanced due to the nanodisordered effect in KTN crystals and the half-wave driving voltage can be correspondingly reduced.

5. The system of claim 1 wherein the plurality of nanodisordered potassium tantalate niobate crystals operates as a phase or intensity modulator that is oriented so as to modulate an interrogation beam and transmit the modulated interrogation beam to the retroreflector, and wherein said retroreflector is oriented so as to reflect the modulated interrogation beam through the nanodisordered potassium tantalate niobate crystals to a receiver.

6. The system of claim 1 further comprising drive circuitry that operates to produce an input signal such that the voltage of the input signal causes the nanodisordered potassium tantalate niobate crystals to shutter the interrogation light passing therethrough, resulting in a modulated interrogation beam.

7. The system of claim 1 wherein the system is a high-speed, wide field-of-view, large aperture shutter that is configured to operate as a free-space modulator for high-speed, long distance line-of-sight laser communications.

8. An electro-optic modulator comprising:
a plurality of nanodisordered potassium tantalate niobate crystals; the nanodisordered potassium tantalate niobate crystals becoming nanodisordered by reducing the temperature of the nanodisordered potassium tantalate niobate crystals to the Curie temperature to realize a higher electro-optic Kerr coefficient such that the driving voltage can be correspondingly reduced; the Curie temperature corresponding to the temperature at which the permittivity and electro optic Kerr coefficient reaches a maximum value;
first and second conductors operatively connected to the plurality of nanodisordered potassium tantalate niobate crystals adapted to be connected to a voltage source to modulate light passing therethrough;
a retroreflector for reflecting light back through the plurality of nanodisordered potassium tantalate niobate crystals;
whereby light is modulated by passing through the plurality of nanodisordered potassium tantalate niobate crystals.

9. The modulator of claim 8 further comprising an enclosure comprising windows allowing light to enter while operating to prevent condensation of water on the plurality of nanodisordered potassium tantalate niobate crystals; and wherein the retroreflector that reflects the modulated light comprises a prism.

10. The modulator of claim 9 further comprising a receiver and wherein light passing through the plurality of potassium tantalate niobate crystals comprises a light beam emitted by a light source and wherein the light reflected by the retroreflector comprises a phase or intensity modulated beam that is received by the receiver.

11. The modulator of claim 8, wherein the modulator is a high-speed, wide field-of-view, large aperture shutter that is configured to operate as a free-space modulator for high-speed, long distance line-of-sight laser communications.

12. The modulator of claim 8 configured as a phase modulator wherein the intensity of the light passing through remains substantially constant but the phase of two components of the electric field with respect to the y and z directions is modulated.

13. An electro-optic modulator comprising:
an array of nanodisordered potassium tantalate niobate crystals; the potassium tantalate niobate crystals becoming nanodisordered by reducing the temperature of the nanodisordered potassium tantalate niobate crystal to the Curie temperature to realize a higher electro-optic Kerr coefficient such that the driving voltage can be correspondingly reduced; the Curie temperature corresponding to the temperature at which the permittivity and electro optic Kerr coefficient reaches a maximum value;
first and second conductors operatively connected to the array of nanodisordered potassium tantalate niobate crystals adapted to be connected to a voltage source comprising drive circuitry operating to modulate the light passing through the array of potassium tantalate niobate crystals.

14. The modulator of claim 13 further comprising at least one polarizer and wherein the array of nanodisordered potassium tantalate niobate crystals operates as an intensity modulator that is oriented so as to modulate an incoming beam and transmit a modulated beam to a receiver.

15. An electro-optic modulator comprising:
a plurality of nanodisordered potassium tantalate niobate crystals arranged in an array;
first and second conductors configured to connect the plurality of nanodisordered potassium tantalate niobate crystals in series and adapted to be connected to a voltage source to modulate light passing therethrough; the first and second conductors configured such that during operation when a high voltage is applied across the first and second conductors the voltage drops evenly;
a housing surrounding the modulator and a thermoelectric heat exchanger configured to maintain the temperature of the modulator within a predetermined range;
whereby light is modulated by passing through the nanodisordered potassium tantalate niobate crystals.

16. An electro-optic modulator comprising:
a plurality of nanodisordered potassium tantalate niobate crystals arranged in an array; the nanodisordered potassium tantalate niobate crystals becoming nanodisordered by reducing the temperature of the nanodisordered potassium tantalate niobate crystal to the Curie temperature to realize a higher electro-optic Kerr coefficient such that the driving voltage can be correspondingly reduced; the Curie temperature corresponding to the temperature at which the permittivity and electro optic Kerr coefficient reaches a maximum value;
first and second conductive strips placed between and connecting the plurality of nanodisordered potassium tantalate niobate crystals in series and configured such that during operation when a high voltage is applied across the first and second conductive strips the voltage drops evenly across conductive strips;
whereby light is modulated by passing through the nanodisordered potassium tantalate niobate crystal.

17. A method for modulating light comprising the following steps not necessarily in following order:
providing an array of potassium tantalate niobate crystals;
reducing the temperature of the potassium tantalate niobate crystals to the Curie temperature to produce nanodisordered potassium tantalate niobate crystals to thereby realize a higher electro-optic Kerr coefficient such that the driving voltage can be correspondingly reduced; the Curie temperature corresponding to the temperature at which the permittivity and electro-optic Kerr coefficient reaches a maximum value;
providing first and second conductors positioned with the the nanodisordered potassium tantalate niobate crystals therebetween so as to produce a capacitive effect and adapted to be connected to a voltage source to modulate light passing therethrough;
providing an interrogating light beam striking at least one nanodisordered potassium tantalate niobate crystal;
providing drive circuitry configured to modulate the light passing through the array of potassium tantalate niobate crystals;

modulating light passing through the nanodisordered potassium tantalate niobate crystals; and receiving a modulated light beam.

18. The method of claim 17 further comprising drive circuitry which provides the voltage to modulate the interrogating light beam and a receiver to receive the modulated light beam, and wherein the drive circuitry transmits a signal containing information to be received by the receiver.

19. The method of claim 18 further comprising a retroreflector that reflects the modulated light.

20. A method for modulating light comprising the following steps not necessarily in following order:

providing a plurality of potassium tantalate niobate crystals arranged in an array;

reducing the temperature of the potassium tantalate niobate crystals to the Curie temperature to produce a nanodisordered potassium tantalate niobate crystals to thereby realize a higher electro-optic Kerr coefficient such that the driving voltage can be correspondingly reduced; the Curie temperature corresponding to the temperature at which the permittivity and electro-optic Kerr coefficient reaches a maximum value;

providing first and second conductive strips between the plurality of potassium tantalate niobate crystals to connect the nanodisordered potassium tantalate niobate crystals in series; the first and second conductive strips adapted to be connected to a voltage source configured such that during operation when a high voltage is applied across the first and second conductors the voltage drops evenly across conductive strips;

providing an interrogating light beam striking the array of nanodisordered potassium tantalate niobate crystals;

modulating light passing through the nanodisordered potassium tantalate niobate crystals; and receiving a modulated light beam.

* * * * *